United States Patent [19]
Hall, Sr.

[11] Patent Number: 6,105,303
[45] Date of Patent: Aug. 22, 2000

[54] FISHING LURE

[76] Inventor: James R Hall, Sr., 3492 Ruby Rd., Hartsville, S.C. 29550

[21] Appl. No.: 09/118,399

[22] Filed: Jul. 17, 1998

[51] Int. Cl.[7] .................................................. A01K 85/02
[52] U.S. Cl. ............................ 43/42.04; 43/37; 43/42.08; 43/42.36; 43/42.41; 43/43.11
[58] Field of Search ............................. 43/34–37, 42.36, 43/42.1, 42.35, 42.41, 43.11, 43.2, 43.4, 42.04, 42.08, 41.2, 42.05

[56] References Cited

U.S. PATENT DOCUMENTS

| | | | |
|---|---|---|---|
| 975,993 | 11/1910 | Payton | 43/35 |
| 1,345,173 | 6/1920 | Halder | 43/35 |
| 1,869,111 | 7/1932 | McLaughlin | 43/35 |
| 1,915,208 | 6/1933 | Walthers | 43/43.11 |
| 2,014,517 | 9/1935 | Beregow | 43/43.11 |
| 2,325,107 | 7/1943 | Burns | 43/42.1 |
| 2,435,011 | 1/1948 | Mason | 43/43.11 |
| 2,464,715 | 3/1949 | Peterson | 43/43.2 |
| 2,475,736 | 7/1949 | Burrous | 43/41.2 |
| 2,498,815 | 2/1950 | McVay | 43/43.11 |
| 2,514,110 | 7/1950 | Warren | 43/43.2 |
| 2,594,011 | 4/1952 | Granger | 43/43.2 |
| 2,607,154 | 8/1952 | Martens | 43/43.11 |
| 2,700,842 | 2/1955 | Lehmann | 43/35 |
| 2,712,197 | 7/1955 | Lewis | 43/43.11 |
| 2,722,767 | 11/1955 | Grady | 43/43.11 |
| 2,734,303 | 2/1956 | Peck et al. | 43/44.9 |
| 2,768,464 | 10/1956 | Volz | 43/41.2 |
| 2,778,146 | 1/1957 | Peck | 43/44.9 |
| 2,871,046 | 1/1959 | Smith | 43/42.08 |
| 2,892,283 | 6/1959 | Hudson | 43/44.9 |
| 3,226,874 | 1/1966 | Boyd | 43/42.36 |
| 3,694,951 | 10/1972 | Modeme | 43/41.2 |
| 3,753,309 | 8/1973 | Bryant | 43/41.2 |
| 4,020,583 | 5/1977 | Gatlyn | 43/42.41 |
| 4,068,400 | 1/1978 | McCoy | 43/43.2 |
| 4,534,127 | 8/1985 | Thorvaldsen | 43/41.2 |
| 4,610,104 | 9/1986 | Garcia | 43/41.2 |
| 5,090,151 | 2/1992 | Salminen | 43/42.08 |
| 5,117,574 | 6/1992 | Perry | 43/42.36 |
| 5,806,233 | 9/1998 | Murphy | 43/42.04 |
| 5,826,367 | 10/1998 | Murphy | 43/42.24 |
| 5,926,991 | 7/1999 | Chesnut | 43/41.2 |

FOREIGN PATENT DOCUMENTS

| | | | |
|---|---|---|---|
| 63589 | 1/1926 | Sweden | 43/43.11 |

*Primary Examiner*—Michael J. Carone
*Assistant Examiner*—Darren W. Ark
*Attorney, Agent, or Firm*—Micael A. Mann; Nexsen, Pruet, Jacobs & Pollard, LLP

[57] ABSTRACT

A weedless fishing lure that does not have an exposed hook until a sufficient tension is placed on the line. The lure comprises a body having an aperture therethrough and at least one channel. A fishing line extends through the aperture and is attached to the shank of a hook. The hook is placed into a channel changing the direction the line runs from that in the aperture so that the line in the channel runs in the opposite direction than that in the aperture. The tip of the hook may be placed in the aperture or in a separate channel. Using this configuration, the hook will be dislodged from the body if sufficient tension is placed on the line.

4 Claims, 2 Drawing Sheets

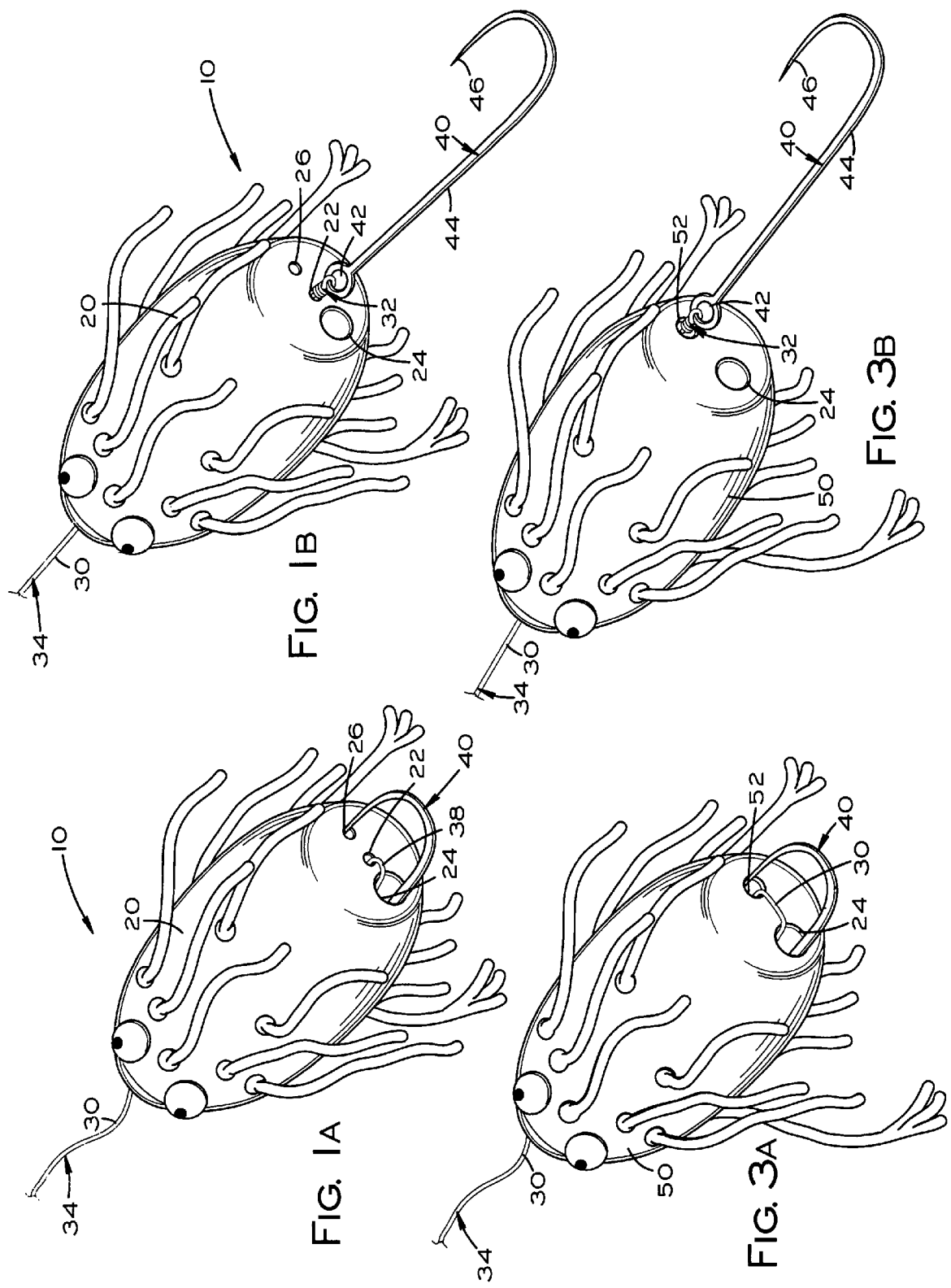

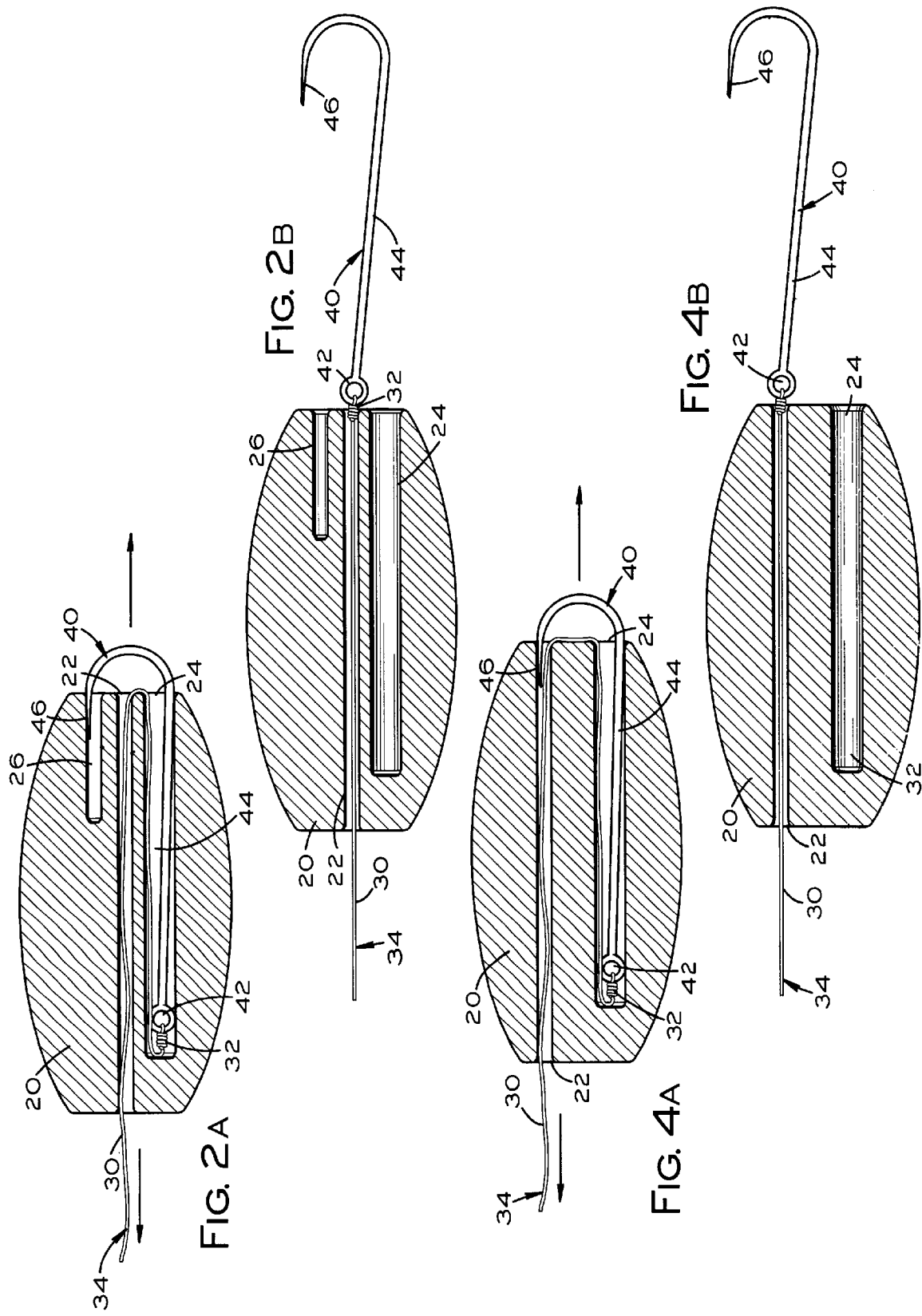

FISHING LURE

BACKGROUND OF THE INVENTION

1. Field of the Invention

The present invention relates fishing lures. In particular, the present invention is a fishing lure that can be used in shallow water where there is growing vegetation.

2. Discussion of Background

Those who enjoy fishing routinely become frustrated when their hooks get caught on objects in the water, including vegetation. Various so-called "weedless" lures have been devised to reduce the occurrence of this problem. A "weedless" lure is one that does not get caught on weeds or other vegetation growing in shallow water. Although these lures reduce this occurrence, they still have exposed hooks. Therefore, there is a need for a fishing lure that does not have an exposed hook to get caught on vegetation or other objects in the water.

SUMMARY OF THE INVENTION

According to its major aspects and broadly stated, the present invention is a weedless fishing lure. The term weedless means that the lure is designed so that the hook will not be inadvertently caught on weeds, seaweed, algae, lillypads, or any other undesirable object on which hook could get caught. The lure comprises a body having an aperture therethrough and at least one channel. A fishing line extends through the aperture and is attached to the shank of a hook. The hook is placed into the channel so that the line in the channel runs in the opposite direction from that in the aperture. The tip of the hook is placed in the aperture or in a separate channel so that the tip does not extend from the body. When the fish takes the lure, the tension on the line springs the hook into the mouth of the fish. The amount of tension required to spring the hook depends on the shape of the channel, how far the hook is inserted into the channel and the degree to which the hook is compressed in order to put it into the channel.

A major feature of the present invention is having the hook carried by a channel in the body when fishing so that the hook is not exposed until sufficient tension is applied to the line. The hook is sprung from the body when tension on the line pulls the hook tip free of the channel. This springing of the hook occurs because the line running through the body reverses direction when it exits the aperture at the back of the body and enters the channel. When tension is applied to the line, it relieves this tension by pulling the hook and its line back out of the channel A major advantage of the present invention is that the lure is weedless because the tip of hook is not exposed until sufficient tension is placed on the line. The user will not experience frustration in getting the hook caught on weeds, algae, lillypads, or other undesirable objects. Consequently, the user can fish in areas that could not normally be fished because hook would get caught.

Another important advantage of the present invention is the increased safety by not having an exposed hook on the lure when casting because the hook is not exposed.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1A is a perspective view of a fishing lure with the hook held by the body, according to a preferred embodiment of the present invention;

FIG. 1B is a perspective view of a fishing lure with the hook dislodged from the body, according to a preferred embodiment of the present invention;

FIG. 2A is a side cross-sectional view of a fishing lure with the hook held by the body, according to a preferred embodiment of the present invention;

FIG. 2B is a side cross-sectional view of a fishing lure with the hook dislodged from the body, according to a preferred embodiment of the present invention;

FIG. 3A is a perspective view of a fishing lure with the hook held by the body, according to an alternative embodiment of the present invention;

FIG. 3B is a perspective view of a fishing lure with the hook dislodged from the body, according to an alternative embodiment of the present invention;

FIG. 4A is a side cross-sectional view of a fishing lure with the hook held by the body, according to a alternative preferred embodiment of the present invention; and FIG. 4B is a side cross-sectional view of a fishing lure with the hook dislodged from the body, according to an alternative embodiment of the present invention.

DETAILED DESCRIPTION OF A PREFERRED EMBODIMENT

Referring now to the figures, the present invention is a weedless fishing lure. The term "weedless" means that the lure is designed so that the hook will not be inadvertently caught on weeds, seaweed, algae, lillypads, or any other undesirable objects on hooks routinely get caught, and is commonly used to describe lures that try to protect the otherwise exposed tip of the hook. Lure, generally referred to by reference number 10, comprises a body 20 having an aperture 22, at least one channel 24 and 26 and a hook 40 attached to a line 30. As illustrated in FIGS. 2A and 2B, hook 40 is carried by body 20 until tension on line 30 is sufficient to spring hook 40 from body 20.

Hook 40 is preferably a standard fishhook, but could be any type of hook capable of catching fish. Hook 40 comprises an eyelet 42, a shank 44, and a tip 46. As is customary with fishhooks, tip 46 may be barbed to resist removal of tip 46. Hook 40 is attached to fish line 30 preferably using eyelet 42; although any other means in the art for attaching line 30 to hook 40 may be used. Line 30 has a first end 32 attached to eyelet 42 and a second end 34 extending to reel, pole or other fishing device. Line 30 is preferably a standard fishing line, but could be any type of cable, cord, string, wire, or other type of line that could be used for fishing.

Body 20 comprises an aperture 22 extending longitudinally therethrough and at least one channel 24 and 26. While aperture 22 has a sufficient diameter to allow first end 32 of line 30 to extend therethrough, preferably diameter is sufficiently small so that shank 44 of hook 40 cannot extend within aperture 22. Preferably, body 20 has a first channel 24 to hold shank 44 of hook 40 and a second channel 26 to hold tip 46 of hook 40 as illustrated in FIG. 2A. Channels 24 and 26 do not need to extend all the way through body 20. First channel 24 has sufficient diameter and depth to hold shank 44 of hook 40. As illustrated in FIG. 2A, shank is placed in first channel causing first end 32 of line 30 to run in the opposite direction as line 30 in aperture 22. This bend is significant in the operation of the present invention. The bend in line 30 causes hook 40 to be sprung from body 20 if sufficient tension is placed on second end 34 of line 30. Second channel 26 need not be as deep as first channel 24 but merely sufficient to hold tip 46 of hook 40. The distance between first channel 24 and second channel 26 should approximately correspond to the distance between shank 44 and tip 46. Body 20 may have additional channels to accommodate numerous sizes of hooks by having a plurality of channels that could hold either shank 44 or tip 46 wherein the particular channels that are used depends upon the size of hook. Tip 46 of hook 40 can be placed into second channel 26 with varying degrees of pressure so that the tension needed on second end 34 of line 30 to spring hook 40 can be varied; moreover, it is clear that second channel 26 can be dimensioned and shaped to require a particular amount of tension on second end 34 of line 30 to spring hook 40 from body 20. Body 20 could have a plurality of channels for holding tip 46 dimensioned to require varying amounts of tension on second end 34 of line 30 to spring hook 40. In an alternative embodiment, body 20 may have only one channel to hold shank 44 while tip 46 is held by aperture 22 as illustrated in FIG. 4A.

Body 20 is preferably shaped as an attractant, such as various types of insects, spiders, small fish, frogs, or any other shapes used in the art of fish lures. Body 20 could be made of wood, styrofoam, aluminum, but is preferably made of a plastic having a density less than that of water to allow it to float.

In use, first end 32 of line 30 is fed through aperture 22 and attached to eyelet 42. Shank 44 of hook 40 is placed into first channel 24 while tip 46 of hook 40 is placed into either second channel 26 or aperture 22. If the fisher applies sufficient tension to second end 34 of line 30, hook 40 will spring from body 20.

It will be apparent to those skilled in the art that many changes and substitutions can be made to the preferred embodiment herein described without departing from the spirit and scope of the present invention.

What is claimed is:

1. A fishing lure in combination with a line having a first end and a second end, said combination comprising:

a hook having a shank and a tip, said hook carried by a body, said shank secured to said first end of said line; and said body having an aperture therethrough and a first channel wherein said first end of said line extends through said aperture, said shank of said hook being held by said first channel so that said first end of said line runs in the opposite direction of said second end of said line, and wherein said body has a second channel formed therein, said tip being held by said second channel.

2. The fishing lure as recited in claim 1, wherein the distance between said shank and said tip is approximately slightly larger than the distance between said aperture and said first channel.

3. The fishing lure as recited in claim 1, wherein said body is shaped in the form of a fish attractant.

4. The fishing lure as recited in claim 1, wherein said body is formed from a material that can float in water.

* * * * *